UNITED STATES PATENT OFFICE.

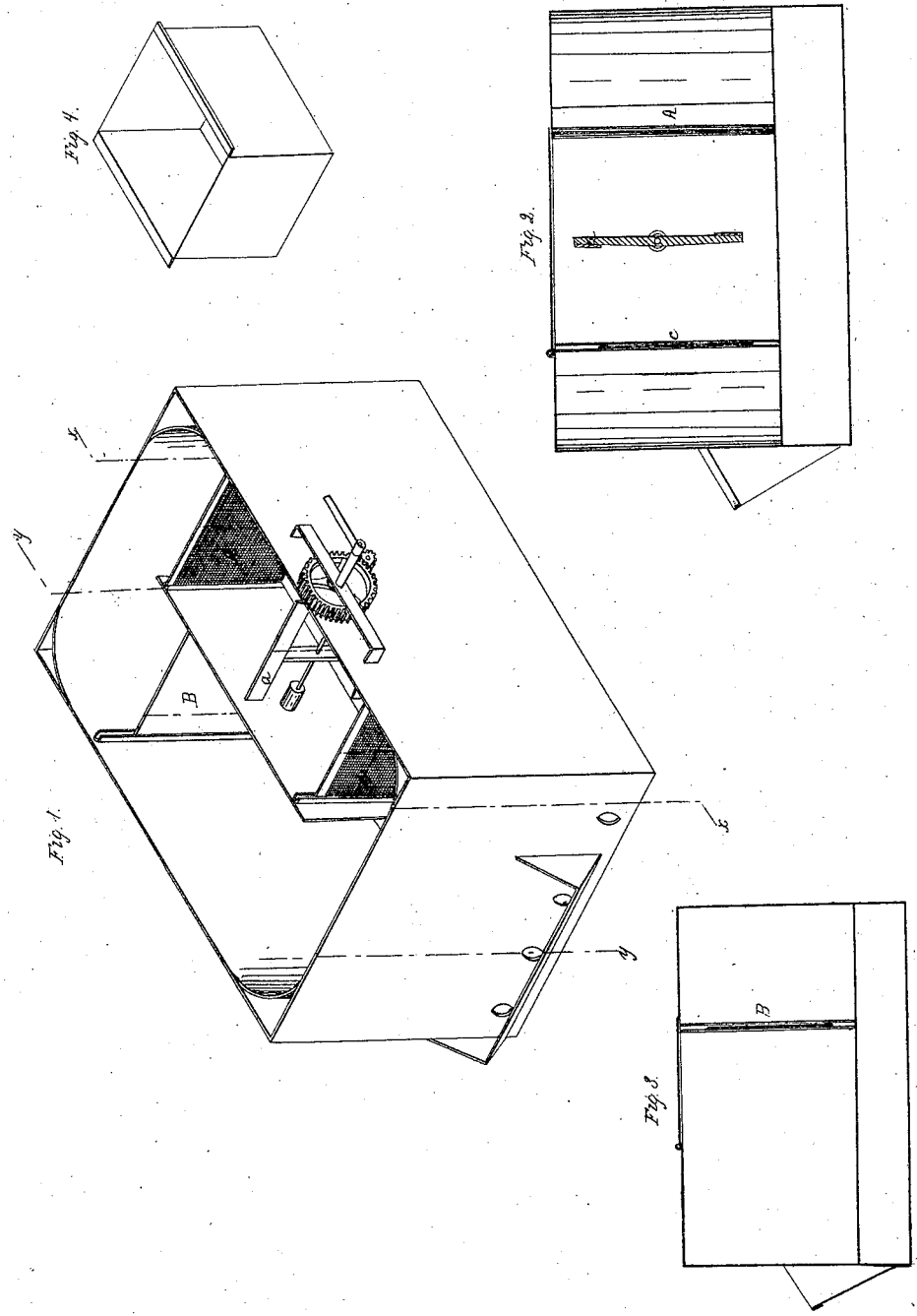
D. E. Teal.
Rotary Churn.
Nº 52,467.
Patented Feb. 6, 1866.

DANIEL E. TEAL, OF NORWICH, NEW YORK.

IMPROVEMENT IN CHURNS.

Specification forming part of Letters Patent No. 52,467, dated February 6, 1866.

*To all whom it may concern:*

Be it known that I, DANIEL E. TEAL, of Norwich, Chenango county, and State of New York, have invented a new and Improved Churn—a new method for converting cream or milk into butter; and I do hereby declare that the following is a full and exact description thereof, reference being had to the accompanying drawings, and to the letters of reference marked thereon, in which—

Figure 1 represents a perspective view of my churn with cover removed for the purpose of showing the combined arrangement of the several screens hereinafter referred to. Fig. 2 is a longitudinal vertical section at line $xx$, and Fig. 3 the same at line $yy$ of Fig. 1. Fig. 4 represents a movable metallic box fitted to set in the apartment opposite the wheel and resting on sustaining-flanges in which to put ice or water to bring the cream or milk to the desired temperature.

My machine is intended to be operated by crank or pulley.

The front part of my machine, including the paddle-wheel, (the two ends of the apartment being tight,) represents the rotary churn heretofore patented and now in use.

My improvement consists in the arrangement for forcing the cream or milk around through another apartment through screens A B C, by which the necessary friction is acquired, and the air which has imparted its butter-making qualities to the cream or milk is liberated, and a new supply of fresh air is substituted, greatly facilitating the operation, and also in the location of the material for regulating the temperature of the milk or cream at the top instead of at the bottom, as heretofore in use, thereby simplifying the machine and more rapidly and effectually bringing the cream or milk to the desired temperature.

The first screen, A, serves to break the cream or milk into small streams, (being forced through by the paddle A,) thus securing necessary friction, and allowing the atmosphere to come in contact with every part of the cream or milk.

The second screen or gate, B, is intended to be pressed down so as to have the lower edge a little below the surface of the cream or milk, so that the cream or milk running under will be nearly freed from the air forced in by the paddle and going through the first screen and ready to receive fresh atmospheric air.

The third screen, C, is intended to be pressed down below the surface of the cream or milk, and still leave a space below for the unchurned cream to pass, while the screen arrests and keeps back the butter already formed and floating on the surface, and prevents it from unnecessarily again coming in contact with the paddle-wheel.

The paddles are intended to be made concave on the side that strikes the cream or milk, so that a quantity of air will be forced under the surface and forced through the screen with the milk or cream, thus bringing a large portion of the milk or cream into contact with the air.

When the butter is formed the gathering, salting, and rinsing processes are performed by the continued operation of the machine, the screens and gate being removed.

What I claim, and wish to secure by Letters Patent, is—

1. The arrangement by which the milk or cream is made to perform a circuit through different apartments and through screens, as described, by which all parts of the milk or cream are agitated and subjected to the necessary amount of friction, and brought into contact with the atmosphere at each circuit of the milk or cream, the screen keeping the butter first formed from passing through the churn unnecessarily.

DANIEL E. TEAL.

Witnesses:
 JOHN WAIT,
 BENJAMIN SLATER.